United States Patent [19]

Matsubara et al.

[11] 4,421,821
[45] Dec. 20, 1983

[54] CORROSION RESISTANT TIRE RIM

[75] Inventors: Hideyuki Matsubara, Takarazuka; Ikutaka Kosugi, Kyoto; Chiaki Tsukamoto, Ibaragi, all of Japan

[73] Assignee: The Toyo Rubber Industry Company, Limited, Osaka, Japan

[21] Appl. No.: 333,183

[22] Filed: Dec. 21, 1981

[30] Foreign Application Priority Data

Dec. 25, 1980 [JP]  Japan ................................ 55-186755

[51] Int. Cl.³ .......................... B32B 5/16; B60B 21/00
[52] U.S. Cl. ................................ 428/323; 152/362 R; 152/363; 152/365; 152/366; 152/379.5; 152/381.4; 152/381.5; 152/381.6; 152/DIG. 9; 301/96; 301/97; 428/324; 428/325; 428/334; 428/335; 428/336; 428/363; 428/418; 428/463

[58] Field of Search ............... 428/328, 323, 324, 325, 428/418, 463, 363, 334, 335, 336; 301/37 P, 58, 96, 97, 98; 152/DIG. 9, 363, 365, 366, 362 R, 379.5, 381.4, 381.5, 381.6

[56] References Cited

U.S. PATENT DOCUMENTS

| 3,499,820 | 3/1970 | Desauliniers | 428/328 |
| 3,988,493 | 10/1976 | Yallourakis | 428/328 |
| 4,297,405 | 10/1981 | Kasahara | 428/328 |
| 4,317,857 | 3/1982 | Kanda | 428/328 |

Primary Examiner—Ellis P. Robinson
Attorney, Agent, or Firm—Wenderoth, Lind & Ponack

[57] ABSTRACT

A corrosion-resistant tire rim coated with a plastic paint which is obtained by the addition of flake filler to unsaturated polyester resin or epoxy resin in order to improve the chemical-resistance.

8 Claims, 1 Drawing Figure

CORROSION RESISTANT TIRE RIM

FIELD OF THE INVENTION

The present invention relates to a tire rim having improved resistance to corrosion.

SUMMARY OF THE INVENTION

The corrosion-resistant tire rim of this invention is a new invention characterized by much more excellent stability of the painted coating and long durability as compared with the usual tire rims; the tire rim has remarkably great corrosion-resistance against corrosive substances, such as moisture, oxygen and sulfur-containing compounds, under the conditions of elevated temperature inside the tire.

DETAILED DESCRIPTION OF THE INVENTION

Figure 1:
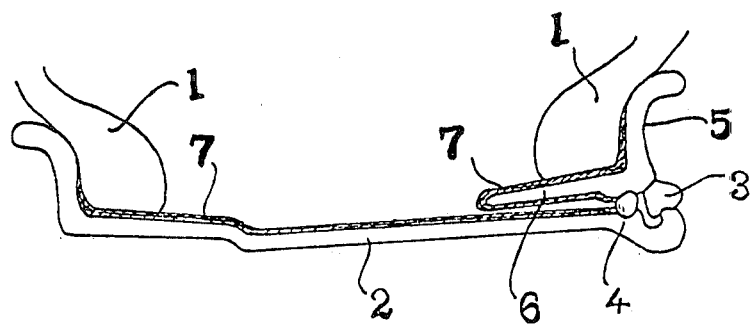
FIG. 1 illustrates a section of the tire rim of this invention, wherein the references designate the following elements:
1. tire
2. the tire rim base
3. lock ring
4. sealing ring
5. side flange
6. bead seat band
7. parts coated with the paint

This invention is concerned with the corrosion-resistant tire rim whose surface is treated with excellent corrosion-resistant and durable coating of unsaturated polyester resin or epoxy resin reinforced with chemical-resistant flake filler; that is, this invention is concerned with the corrosion-resistant tire rim with the said corrosion-resistant and durable coating which is able to maintain excellent adhesion to the tire rim base under high frequency vibration and high temperature and is able to protect the tire rim for a long time from corrosive substances such as moisture, oxygen and sulfur-containing compounds which are present inside the tire.

Usual tire rims for cars or off-the-road cars are made of steel or aluminium, etc., and almost all high-loaded off-the-road car tire rims and truck tire rims are made of steel because the strength of aluminium rims is not enough.

The tire is a molded article of vulcanized rubber containing a curing agent such as sulfur, accelerator, other fillers and additives.

This tire is mounted on the rim and air is sent with pressure inside the tire, and the wheel thus is ready for use. When the air is forced into the tire with pressure until a fixed pressure is obtained, moisture may often be present inside the tire. Some large tires for off-the-road cars are filled with water instead of air.

This moisture, oxygen in the surrounding air and sulfur-containing compounds derived from the surrounding rubber material may exert corrosive effect on the tire rim. Vibration and elevation of temperature inside the tire during running make the circumstances even more severe so that corrosion of the tire rim may be accelerated.

The corrosion decreases the mechanical strength of the tire rim base, which makes holes in the tire rim, causes air leaks, makes it difficult to maintain the inner pressure of the tire and results in damage in the tire carcase, so that the wheel cannot be used any more.

Attempts to make corrosion-resistant tires have so far been carried out by coating the tire rim base with various corrosion-resistant and heat-resistant coatings for the prevention of corrosion of the tire rim, but no effective anticorrosives have been found until now; corrosion prevention of tire rims still remains an important problem in the industry.

The inventors have concentrated their efforts on solving the problem of prevention of corrosion of tire rims described above, and have invented a corrosion-resistant tire rim having a very excellent corrosion-resistant coating of long durable life. This invention offers a corrosion-resistant tire rim coated with a plastic paint obtained by adding chemical-resistant flake filler to unsaturated polyester resin or epoxy resin.

As the result of the study by the inventors, it has been confirmed that unsaturated polyester resin coating or epoxy resin coating is desirable as the corrosion-resistant coating material that can meet the requirement for corrosion-resistant tire rims, and that a flake reinforcing filler, which can be arranged regularly to form a much more multilayered coating than fine powder or fiber reinforcing fillers, can improve greatly the stability of the coating of the tire rim. That is, the coating has great heat-resistance, vibration-resistance, and durability which is far beyond the reach of the usual coatings used so far.

As the flake filler to be added to the unsaturated polyester resin or epoxy resin described above, chemical-resistant fillers such as glass flakes, graphite, mica etc. of 30 to 325 Tyler mesh are desirable.

If the particle size is less than 30 mesh, the coated surface is apt to be rough and not uniform, and if more than 325 mesh, such granular filler may decrease the corrosion-resistance.

A content of the flake filler of 10 to 100 weight parts per 100 weight parts of the base resin is generally desirable. Within this range the content in the undercoating or in the surface-coating may sometimes be varied. If the content is less than 10 weight parts, the corrosion resistance is not enough, and if more than 100 weight parts, the viscosity of the paint becomes so high that uniform coating becomes impossible. A more desirable content is 20 to 70 weight parts.

As the unsaturated polyester resin used for the base polymer of the paint, a material obtained by dissolving the well-known resins such as orthophthalic acid compounds, isophthalic acid compounds, terephthalic acid compounds, bisphenol A compounds, chlorendic acid compounds and vinyl ester compounds in a vinyl monomer is used, and to this material an accelerator for resin-formation such as cobalt naphthenate, manganese naphthenate, dimethyl aniline etc. is added, and pigments are also combined therein.

As the curing agent, peroxides such as methylethylketone peroxide, cumene peroxide, benzoyl peroxide, etc. is used, and curing is performed at ordinary temperature or by heating.

The epoxy resin used is a commercially available epoxy resin such as those obtained by curing at ordinary temperature or by heating of the reaction product of bisphenol A and epichlorohydrin together with a curing agent such as amines, polyamines, amides, amide-amines, amine adducts, acid anhydrides (such as phthalic anhydride, maleic anhydride and trimellitic acid anhydride) etc. The epoxy resin may also be combined with pigments or other additives generally used.

The coating with the unsaturated polyester resin or epoxy resin containing the flake filler of this invention can be carried out with spraying apparatus with air- or airless-gun, brush, trowel, patty etc. Prior to the coating, the said epoxy compounds, unsaturated polyester compounds, or other commercially available rust-resistant coating such as a zinc-rich primer or a wash primer may be painted on the rim as a rust-resistant primer and for the improvement of adhesion.

Preferably the entire outer and inner surfaces are coated in order to prevent rust, but the minimum surface to be coated is the part covered with the tire as shown in FIG. 1.

There are various forms of tire rims, and the section of one of them is shown in FIG. 1.

In FIG. 1, (1), (2), (3), (4), (5), and (6) indicate tire, tire rim base, lock ring, sealing ring, side flange, and bead seat band, respectively. The part illustrated with bold lines in (7) is the surface to be coated.

The thickness of the coating should be 50 to 2000$\mu$.

The thickness of 100 to 1000$\mu$ is more preferable when all of the necessary factors such as corrosion-resistance, vibration-resistance, heat-resistance, anti-expansion-shrinkage etc. are taken into consideration.

The tapered bead seat band (6) of the side flange (5) and the space part of the tire rim base in FIG. 1 are preferably coated in the thickness of less than 300$\mu$ so that the seat band may be easily attached and detached. Some kinds of rim have a welded portion, which is very susceptible to corrosion and therefore is coated particularly thickly so as to be effective against corrosion.

The flake filler in the coating obtained in this way is arranged in parallel to form multi-layers, which may not only reinforce the coating, but also control the permeation of corrosive reagents, improve the corrosive-resistance, form a stable adhesive coating and constitute a desirable tire rim which is very resistant to heat and vibration during running and to the permeation of causal substances of corrosion such as moisture.

In the following this invention is explained with Examples.

EXAMPLE 1

The rim of an off-the-road car tire (18.00-33,32 PR) was divided into 5 sections, which were coated respectively with 5 different heat-resistant paints. 32 PR is the abbreviation of 32-ply tire.

A tire was fabricated with this rim and subjected to a running test with a drum tester. The result is shown in Table 1.

Under the conditions of the pressure of the air inside the tire of 6 kg/cm$^2$, load of 10 ton, running speed at 10 km/H, the highest temperature during running of 125° C., and the bead-surface temperature of 70° C., the test was performed for 23 days in total.

From the result shown in Table 1, it has been found that in the portion coated with the paint used in this invention, obtained by incorporating glass flakes into unsaturated polyester resin or epoxy resin, rust is not recognized at all and thus a very excellent tire rim can be obtained.

EXAMPLE 2

A tire rim similar to that in Example 1 was coated with paints of various compositions in 250$\mu$ thickness, and this tire rim was attached to the tire and subjected to a running test with a drum tester.

TABLE 1

| Test No. | 1 | 2 | 3 | 4 | 5 |
|---|---|---|---|---|---|
| Main component of coating | silicone resin + inorganic synthetic polymer | the same as 1 | silicone resin + anti-rust pigment | unsaturated polyester resin + 30 PHR glass flake | epoxy resin + 30 PHR glass flake |
| Thickness of coating | 300–400 | 300–400 | 100 | 300–400 | 300–400 |
| Heat treatment | 110° C. × 1.5 HR | none | 110° C. × 1 HR | none | none |
| Appearance of coating after testing | Blister appeared in the coating and even in normal-looking part the coating is readily separated by tapping. Rust all over the first coating. | separation of coating, extraordinary rust | the same as 2 | no abnormality was found in the coating | the same as 4 |

Note:
PHR = part per hundred resin

The test conditions were the same as those in Example 1 except that the total number of test days was 40 days.

The result is shown in Table 2.

TABLE 2

| Base resin | Filler | Amount added (PHR) | Appearance of coating after testing |
|---|---|---|---|
| Unsaturated polyester resin of isophthalic acid compounds | glass flake (150 mesh) | 5 | Many small blisters appeared and rust was found in some parts. |
| | | 10 | nothing abnormal |
| | | 50 | nothing abnormal |
| | | 100 | nothing abnormal |
| | | 150 | nothing abnormal |
| Unsaturated polyester of bisphenol A compounds | mica (150 mesh) | 50 | nothing abnormal |
| Epoxy resin of bisphenol compounds | none | 0 | Rust and blister appeared in the coating |
| | glass flake (325 mesh) | 50 | nothing abnormal |

The result in Table 2 shows that the corrosion-resistant tire rim of this invention is very excellent.

We claim:

1. A tire rim having a 100–1000μ thick coating thereon of a composition containing a resin selected from the group consisting of an unsaturated thermosetting polyester resin and an epoxy resin and 10–100 weight parts of a chemically resistant flake filler having a Tyler mesh size of 30–325 per 100 weight parts of the resin.

2. The tire rim described in claim 1, in which the flake filler consists of glass flakes, graphite or mica.

3. The tire rim described in claim 1, having a rust-resistant primer coating of an epoxy compound, an unsaturated polyester compound, a zinc-rich primer or a wash primer.

4. The tire rim described in claim 1, in which the unsaturated polyester resin is obtained by dissolving a synthetic resin, containing units of orthophthalic acid, isophthalic acid, terephthalic acid, bisphenol A, chlorendic acid or a vinyl ester, in a vinyl monomer, adding to the resultant mixture a polymerization accelerator selected from the group consisting of cobalt naphthenate, manganese naphthenate and dimethyl aniline, a pigment and a peroxide curing agent, and curing the resultant mixture.

5. The tire rim described in claim 4, in which the peroxide curing agent is selected from the group consisting of methylethylketone peroxide, cumene peroxide and benzoyl peroxide.

6. The tire rim as described in claim 1, in which the epoxy resin is obtained by reacting bisphenol A with epichlorohydrin, adding to the reaction product a pigment and a curing agent selected from the group consisting of an amine, a polyamine, an amide, an amide-amine, an amine adduct and an acid anhydride, and curing the resultant mixture.

7. The tire rim described in claim 6, in which the acid anhydride curing agent is selected from the group consisting of phthalic anhydride, maleic anhydride and trimellitic acid anhydride.

8. The tire rim described in claim 1 or 2, in which the amount of the flake filler is 20–70 weight parts per 100 weight parts of the resin.

* * * * *